United States Patent [19]

Stoeckli et al.

[11] Patent Number: 4,815,959

[45] Date of Patent: Mar. 28, 1989

[54] APPARATUS FOR DISPENSING DOUGH

[76] Inventors: Oscar W. Stoeckli; Hertha P. Stoeckli, both of 2 Hughes Ave., Rye, N.Y. 10580

[21] Appl. No.: 79,006

[22] Filed: Jul. 29, 1987

[51] Int. Cl.⁴ .................... B29C 47/52; A21C 11/16
[52] U.S. Cl. ......................... 425/331; 99/353; 100/905; 425/376.1; 425/DIG. 230
[58] Field of Search ........... 425/376 R, 376 B, 378 R, 425/DIG. 230, 376.1, 378.1, 374, 331; 99/353, 355, 357, 426; 426/503, 512, 516, 517; 100/905

[56] References Cited

U.S. PATENT DOCUMENTS

| | | | |
|---|---|---|---|
| 521,810 | 6/1894 | Perky | 425/331 |
| 1,777,178 | 9/1930 | Pensotti | 425/241 |
| 1,857,927 | 5/1932 | Mason | 425/239 |
| 2,063,404 | 12/1936 | Selman | 100/905 |
| 2,221,328 | 11/1940 | Rhodes | 425/239 |
| 2,230,094 | 1/1941 | Tubbs | 425/241 |
| 2,356,862 | 8/1944 | Lyons et al. | 425/382 |
| 2,391,050 | 12/1945 | Horn | 425/463 |
| 2,854,932 | 10/1958 | Rochowiak et al. | 425/382 |
| 2,958,900 | 11/1960 | Meakin | 425/463 |
| 3,391,657 | 7/1968 | Reese | 425/461 |
| 3,394,664 | 7/1968 | Roll | 100/905 |
| 3,538,546 | 11/1970 | Gilman | 425/382 |
| 3,602,156 | 8/1971 | Verhoeven | 425/239 |
| 3,758,563 | 9/1973 | Uematsu et al. | 425/331 |
| 3,807,926 | 4/1974 | Morse | 425/DIG. 230 |
| 4,501,543 | 2/1985 | Rutledge et al. | 425/376 B |
| 4,711,622 | 12/1987 | Schaffner | 425/DIG. 230 |

FOREIGN PATENT DOCUMENTS

| | | | |
|---|---|---|---|
| 384999 | 2/1965 | Switzerland | 100/905 |
| 989603 | 4/1965 | United Kingdom | 100/905 |
| 999691 | 7/1965 | United Kingdom | 100/905 |

Primary Examiner—Willard Hoag
Attorney, Agent, or Firm—Robert A. Seemann

[57] ABSTRACT

A housing for receiving a working amount of dough, a shaft mounted on a central axis within the housing, a first wall, curved on a radius from the central axis and having a plurality of apertures formed through it. A feed cylinder mounted on the shaft, the cylinder having a surface eccentric about the central axis with the highest point of eccentricity approximately equal to but less than that of the radius, so that as it is rotated it traverses the apertures with the highest eccentricity in intimate association with them, for separating portions of dough from the working amount. For dough of heavy consistency, spring means is included for urging touching contact between the cylinder and the curved wall, and a cut-off edge may be provided on the cylinder at its highest point of eccentricity.

4 Claims, 5 Drawing Sheets

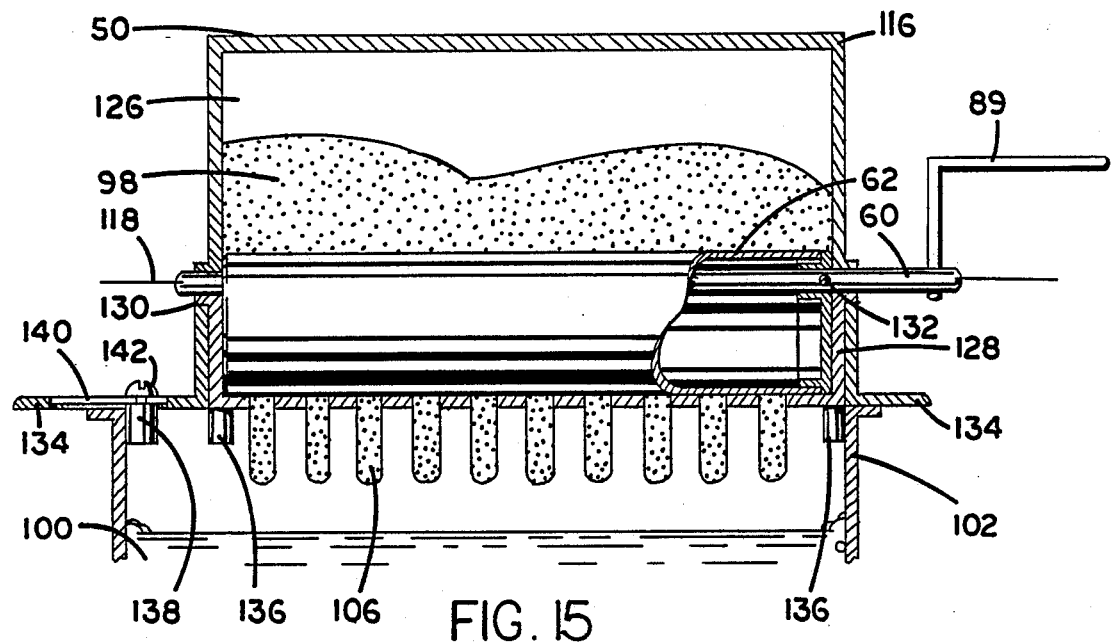
FIG. 15
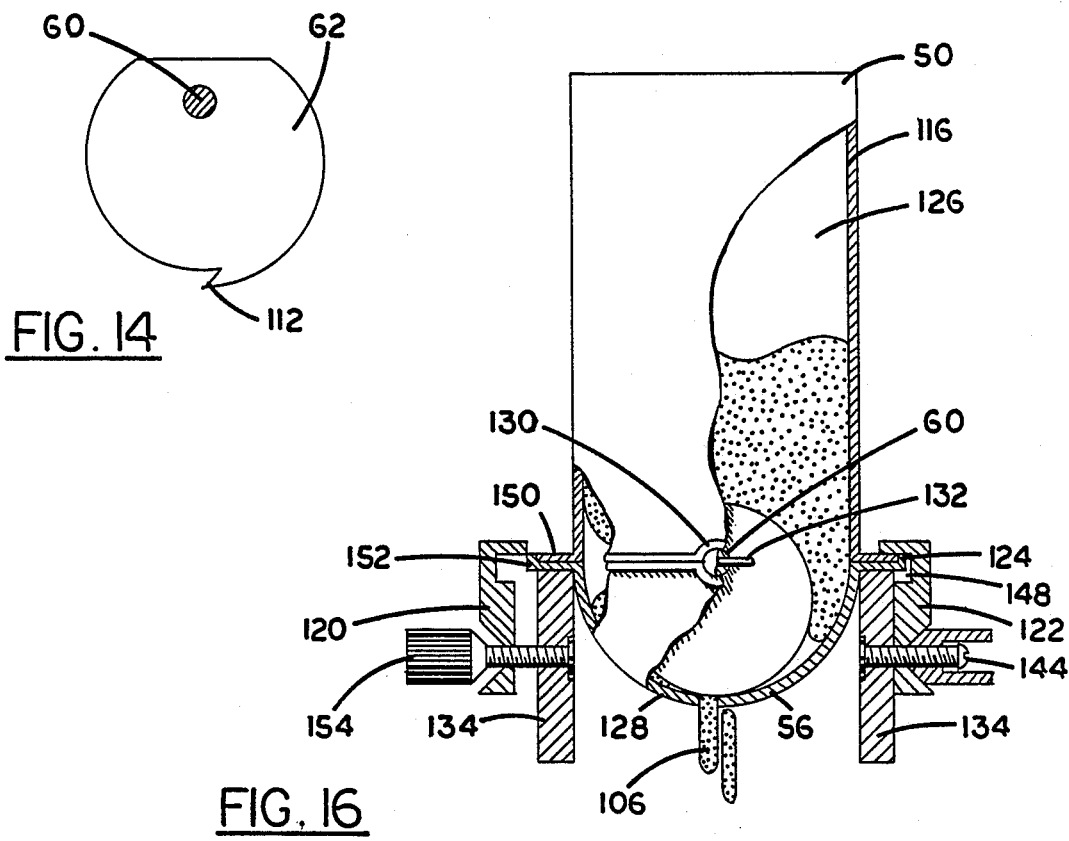
FIG. 14
FIG. 16

APPARATUS FOR DISPENSING DOUGH

BACKGROUND OF THE INVENTION

1. Field of the Invention

The present invention relates in general to plastic material shaping and dispensing, and more particularly to an apparatus and method for dividing and delivering dough or similar plastic material in discrete portions.

2. Description of the Prior Art

Manufacture of small articles made from dough such as doughnuts, dumplings, and small cakes, requires accurate, repeatable dispensing of discrete portions of dough.

Dumplings, for example, usually no more than about one inch long and one half inch in diameter, are manufactured by separating out and dropping individual portions of dough into boiling water. The individual portions must be of uniform size and cleanly separated one from the other's end, and must fall separately so that they do not stick together. The boiling water causes their outer surfaces to congeal, preventing sticking while they cook. The uniform shape and size, piece to piece, assures equal cooking time requirement for each.

The simplest way to obtain separate portions of dough is to spread it out evenly on a board, trim it into a strip that is as wide as the desired length of the portion, and progressively cut the strip transversely into portion widths, scraping each portion off in turn into the boiling water. This is the most common home-method. Depending upon the skill of the operator, the portions can be quite uniform, though the method is slow.

A simple apparatus familiar to Old World kitchens is the combination of a shallow pan with perforated bottom, typically with three-eights inch diameter holes, and a large spoon. The pan is held about eight inches above the boiling water while dough, held in the pan, is pressed down through the holes by the spoon. Portion sizes vary, but the method is a little faster.

Simultaneous delivery of portions is obtained in home kitchens by sliding a small dough-filled hopper over a perforated sieve. The bottom edges of the hopper's leading and trailing walls are made to closely fit the sieve surface so that dough delivery is halted as the walls pass over the holes. Dough must be forced down in the hopper by palm pressure, as with a piston, in order to force it through the holes. Cut-off of and the amount of dough varies from portion to portion.

The rate of portion delivery is improved by use of the home apparatus shown in FIG. 1. Referring to the figure, and numbering of parts therein, bowl 20 is partially filled with dough. As shaft 22 is rotated by handle 24, while the apparatus is kept from turning by fixed handle 26, dough is forced down through holes 28 in perforated bottom 30 by the angled surfaces of blade 32. The length of the portions vary as they are delivered from near the center to the outer diameter of the perforated bottom. Portions exiting near the center of the bottom tend to congeal together due to the relatively slower motion of the blades over that area.

Another kitchen machine is shown in FIG. 2. As cylinder 34 is rotated within housing 36, dough 38 is drawn around into a ribbon between the cylinder and the housing wall. The dough is separated from the cylinder by scraper edge 40, and breaks apart as its weight accumulates at the scraper edge slot 42. The diameter of the pieces which fall into the boiling water container 44, depends upon the consistency of the dough. Their length is limited to the width of the cylinder and length of the scraper edge and slot.

U.S. Pat. No. 2,230,094 awarded to George E. Tubbs, Jan. 28, 1941, teaches a circular housing having an opening at the top for a dough hopper and an opening at the bottom for ejecting dough through a tube.

At the bottom of the tube there is located a reciprocating tubular cut-off and sealing device. Within the hollow housing there is located a concave piston face which reciprocates in an arc across the opening to the dough hopper. A partition plate seals off a portion of the housing so that the concave face draws a partial vacuum as it moves away from the opening to the tube, toward and then across the opening to the dough hopper, thereby drawing dough into the housing.

When the concave face reciprocates back across the opening to the hopper, on its way toward the opening to the tube, a rear portion of the face seals the opening to the hopper while the advancing concave face forces the dough into the tube. The tube cutting device opens to release a portion of dough and then seals, cutting the dough off in the form of a ring, whereupon it is received on a conveyer for processing.

Changes can be made in portion size by changing the stroke arc of the piston, or the stroke or timing of the tubular cutting device. The machine is designed for producing sequential shaped portions, one at a time.

Another machine for providing measured portions of dough, one at a time, is described in U.S. Pat. No. 1,777,178, awarded to Ezio Pensotti on Sept. 30, 1930. In Pensotti, a drum having recesses about its periphery, rotates within a housing that is open to a dough hopper. Each recess includes a closely fitting rotating flapper which scoops the dough out of the recess as the recess passes a cut-off knife edge that extends from the housing. A portion of the dough is forced back into its source-mass before the knife edge, while the remainder of the recess dough is separated from the drum by the knife as the trailing edge of the recess passes the knife.

The dough's tendency to stick to cut-off surfaces is considerably overcome by the minimal cross sectional area of the knife edge opposed to the surface of the flapper and drum.

U.S. Pat. No. 1,857,927, awarded to Jack Mason, May 10, 1932, discloses a housing having a dough-feeding hopper which has at its lower end a feed roller which, by its surface that can be roughened, draws the dough into the housing.

Below the feed roller, there is a drum containing a piston in a through-channel running through and perpendicular to the drum's central axis. The piston has opposed cam shaped faces which form 180 degrees apart pockets within the channel opening and the drum outer diameter.

A roller and a scraper are located at the outer surface of the drum. As the drum rotates, the roller on one side cams against the piston face, driving the piston toward the other side of the drum. Excess dough, collected in the pocket, is cut off by an edge comprising a portion of the housing inner diameter.

Whereby the remainder of the material in the pocket that is formed by the piston head and its recess within the drum is released onto a conveyor for further processing.

The scraper blade serves to clean the cam surface. For each portion of dough delivered by the machine, the drum makes one half revolution, while the feed roller generally makes about three in order to drag enough dough into the machine for a one portion charge.

U.S. Pat. No. 3,602,156 awarded to Albert Verhoeven on Aug. 31, 1971, discloses a machine to deposit cookie dough, jams, candies and the like in which the deposit cycle is followed by a suction on the undeposited material to draw the undeposited material back into the extruder for a better separation between the deposited and undeposited material.

For that purpose, Verhoeven discloses a hopper having a star-shaped cam in communication with the dough hopper. A cam-follower finger is disposed within a dough-delivering chamber which communicates with an effluent port or tube. When the cam follower finger is driven toward the effluent port by a cam lobe, it forces dough out through the port. As the cam follower finger returns to the position between cam lobes, it develops a suction on the effluent port.

The mass of the dough portion beyond the orifice of the effluent port, and synchronized movement of a receiving belt located below the effluent port orifice, preclude drawing of the dough back into the delivering chamber by way of the effluent port when the suction is developed by the camming finger as it withdraws from the region of the effluent port.

H. C. Rhodes, in U.S. Pat. No. 2,221,328, awarded Nov. 12, 1940, discloses a pneumatic dough feeder for use in charging receiving pockets in a reciprocal-plunger dough-dividing machine.

For this purpose he discloses a cam-shaped transfer roller operating within a housing and in communication with a dough hopper. A slidingly but yieldingly seated gate seals against the surface of the cam so that a substantially air tight condition is maintained between the cam face, the exit side of the housing, and its opening to a reservoir for storage of the dough under pressure.

As the cam rotates it forces the dough out through the opening so that it is delivered by way of the reservoir to the receiving pocket of the reciprocal piston dough separator. A float on the exiting pressure side of the housing, controls the amount of dough delivered to the reservoir by the cam arrangement.

The present machines for dividing and delivering dough in discrete portions are generally designed for delivering portions sequentially, although their systems can be ganged for multiple portion delivery. While their systems are adequate for manufacturing bread loaves and doughnuts, they do not lend themselves to economical or high speed delivery of predetermined portions for smaller articles of dough such as dumplings.

SUMMARY OF THE INVENTION

It is one object of the present invention to provide an apparatus and method for dispensing dough predetermined portions.

It is another object of the invention to provide an apparatus and method for dispensing a plurality of predetermined portions simultaneously and continuously.

It is another object of the invention to provide a portion dispensing machine that is simple and economical to manufacture.

Accordingly, there is provided an apparatus for dividing and delivering plastic material in discrete portions. The apparatus comprises a housing for receiving a working amount of the plastic material, a shaft having a central axis and means for mounting the shaft in the housing. A first wall is provided that is curved on a radius generated from the central axis. A feed cylinder is mounted on the shaft. The cylinder has a surface eccentric about the central axis. The highest point from the central axis of its eccentricity is approximately equal to but less than that of the radius.

A plurality of apertures are formed through the curved first wall, and the cylinder is mounted on the housing so that its highest point of eccentricity as it is rotated, traverses the apertures with the highest eccentricity in intimate association with them, for separating the portions of the plastic material from the working amount.

A cut-off edge is provided on the cylinder at its highest point of eccentricity so that the cut-off edge is in intimate association with the apertures during its traverse across the apertures. For dividing plastic material of some consistencies, the cylinder's intimate association with the apertures includes touching contact with the first wall as the highest point traverses the apertures, and the apertures may further include edges having reduced thicknesses.

Means for rotating the cylinder about the central axis are included, as are means such as spring or threaded adjustment on the housing for urging touching contact between the cylinder and the first wall.

In operation, a working amount of the plastic material is put in the housing, the feed cylinder is rotated so that it draws and encaptures an amount of the material between the concave side of the curved wall and the surface of the cylinder, and the cylinder rotation is continued until the plastic material is forced through a plurality of apertures running through the concave wall as the highest point of eccentricity of the cylinder closely approaches the apertures, and rotation is continued so that the highest point of eccentricity traverses the apertures, separating the portions from the working amount, wherein the rotation is continued so that the remainder of the encaptured amount is delivered to a point beyond that of intimate association between the cylinder and the curved wall.

BRIEF DESCRIPTION OF THE DRAWINGS

In order for the invention to be more fully comprehended it will now be described, by way of example, with reference to the accompanying drawings, in which:

FIG. 14 is a view of an element according to one embodiment of the invention.

FIG. 15 is a front cross section view of another embodiment of the invention, mounted over water.

FIG. 16 is a left side partial cut away cross sectional view of the embodiment shown in FIG. 15.

DESCRIPTION OF THE PREFERRED EMBODIMENTS

Figure 1:
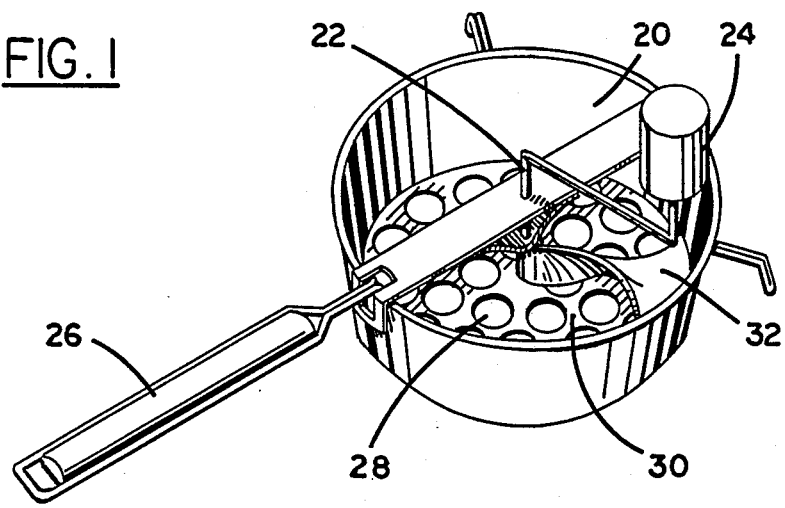
FIG. 1 is a perspective view of a prior art kitchen apparatus.
Figure 2:
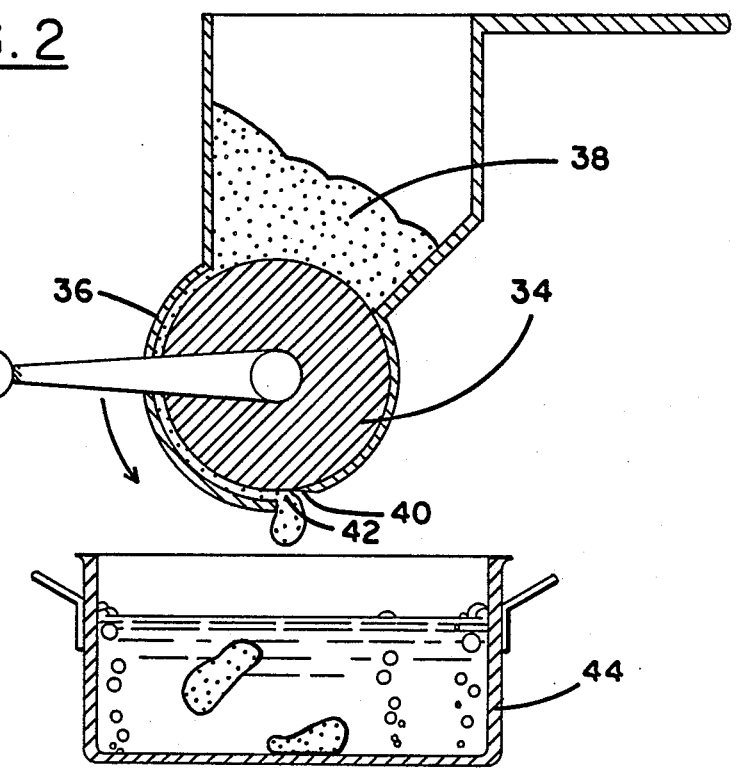
FIG. 2 is a cross sectional view of another prior art kitchen apparatus.

Before explaining the invention in detail, it is to be understood that the invention is not limited in its application to the detail of construction and arrangement of parts illustrated in the drawings, since the invention is capable of other embodiments and of being practiced or carried out in various ways. It is also to be understood that the phraseology or terminology employed is for the purpose of description only and not of limitation.

Figure 3:
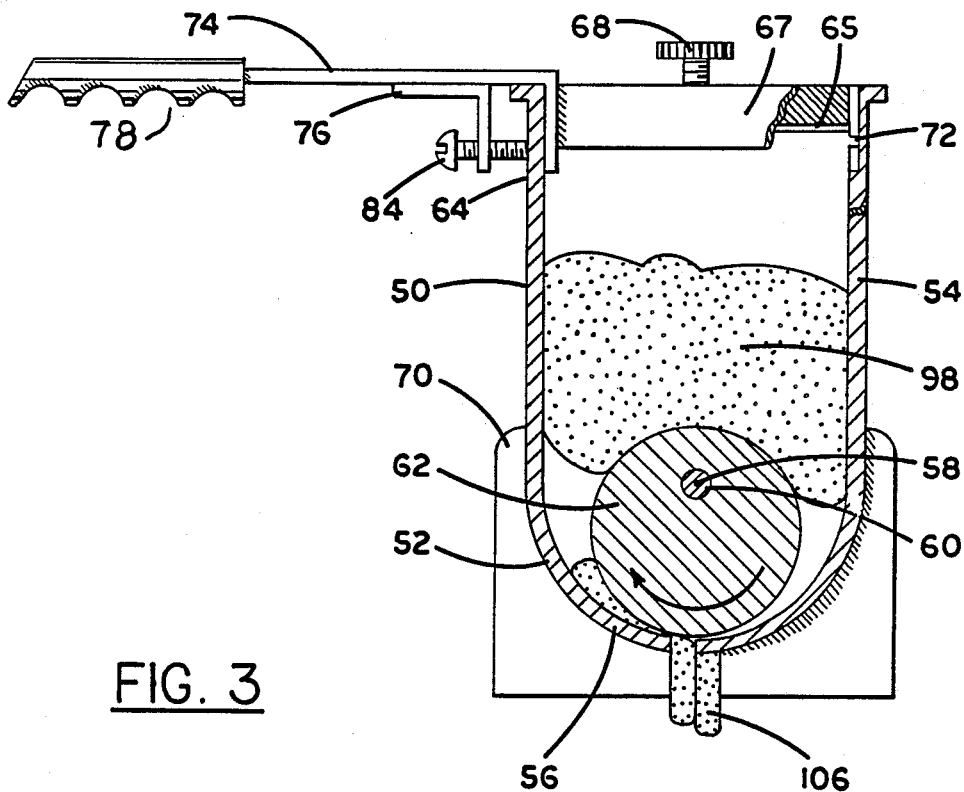
FIG. 3 is a left side cross section view according to one embodiment of the invention.

Referring to the drawings in which like elements have the same reference numbers, in FIG. 3, there is provided an apparatus 50 for dispensing dough, shown in cross section. It is a preferred kitchen model embodiment of the invention. U shaped wall 52 comprises straight left and right side walls 54 and lower curved wall 56 approximately on a radius generated from the central axis 58 of shaft 60. Mounted eccentrically on shaft 60 is feed cylinder 62. The highest point of its eccentricity being approximately equal to the radius of lower curved wall 56.

U shaped walls 52 are sealingly but slidingly joined with outer edges 64 of front and back end plate 66, only the back end plate is seen in this figure. U shaped walls 52 are removable for cleaning and held in place against the outer edges 64 of end plate 66 by tension screws 68 and channel 65 in flange portion 67, the rearward screw being visible in FIG. 3.

When tension screw 68 is tightened in side wall 54 threaded flange portion 67, it draws U shaped side wall 52, including lower curved wall 56 up against the lower curved edges of end plates 66. Side walls 52 and end plates 66 comprise a sealed chamber for holding the dough at its upper portion in intimate contact with the feed cylinder 62.

L shaped support 70, the vertical portion of which is visible in FIG. 3, provides support for mounting the apparatus on a container of boiling water.

Take-up pins 72, one on each side, near the top of each end plate 66, engage with vertical slots in the straight upper side walls 54 to guide the side walls vertically and keep them even when tension screw 68, which is positioned over end plate 66 by channel 65, is adjusted in threaded flange portion 67.

Handle bracket 74 additionally supported by reinforcing bracket 76, contains inslulated handle 78 for holding the apparatus and positioning it over the boiling water.

Handle bracket screw 84 passes through threaded handle bracket 76 and bears on straight upper side wall 54.

Figure 4:
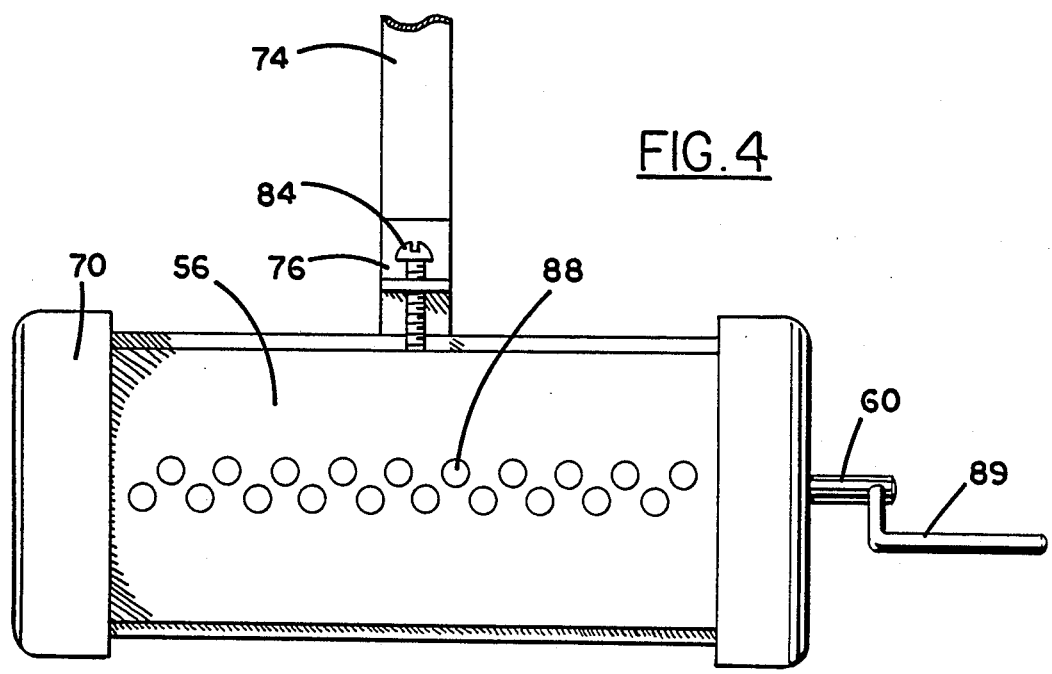
FIG. 4 is a bottom view of the invention showing apertures in a lower curved wall.

A bottom view of lower curved wall 56 is shown in FIG. 4, in which there is seen two rows of dispensing holes. Crank 89 is seen on the right of the apparatus, with shaft 60 for rotating the cylinder.

As shown in FIG. 3, feed cylinder 62 is in intimate association with lower curved wall 56 as it is rotated. The positioning of the lower curved wall with respect to the feed cylinder is adjusted by tension screws 68.

Figure 5:
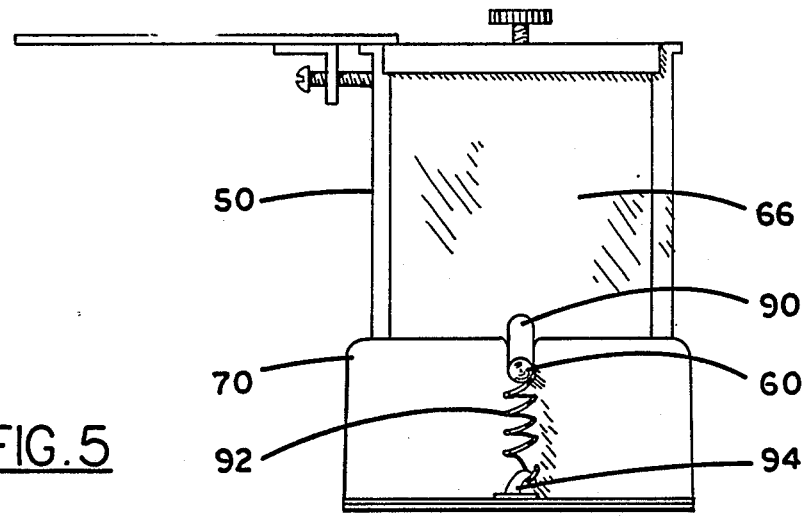
FIG. 5 is a left side view of the invention, showing a biasing mounting means.

In an alternate embodiment shown in FIG. 5, shaft 60 is mounted through end plate 66 by way of plastic bearing seal 90 which sealingly slides in a limited length elongated hole (not shown) in end plate 66. Shaft 60 is biased toward lower curved wall 56 by spring 92 that is attached at its other end to hold-pin 94. This arrangement maintains a relatively constant tension for actual contact of the feed cylinder with the lower curved wall when the feed cylinder is at its highest point of concentricity. The limited length slot prevents feed cylinder 62 from moving, to stay in contact with the lower curved wall when it is rotated up and away from the curved wall.

Figure 6:
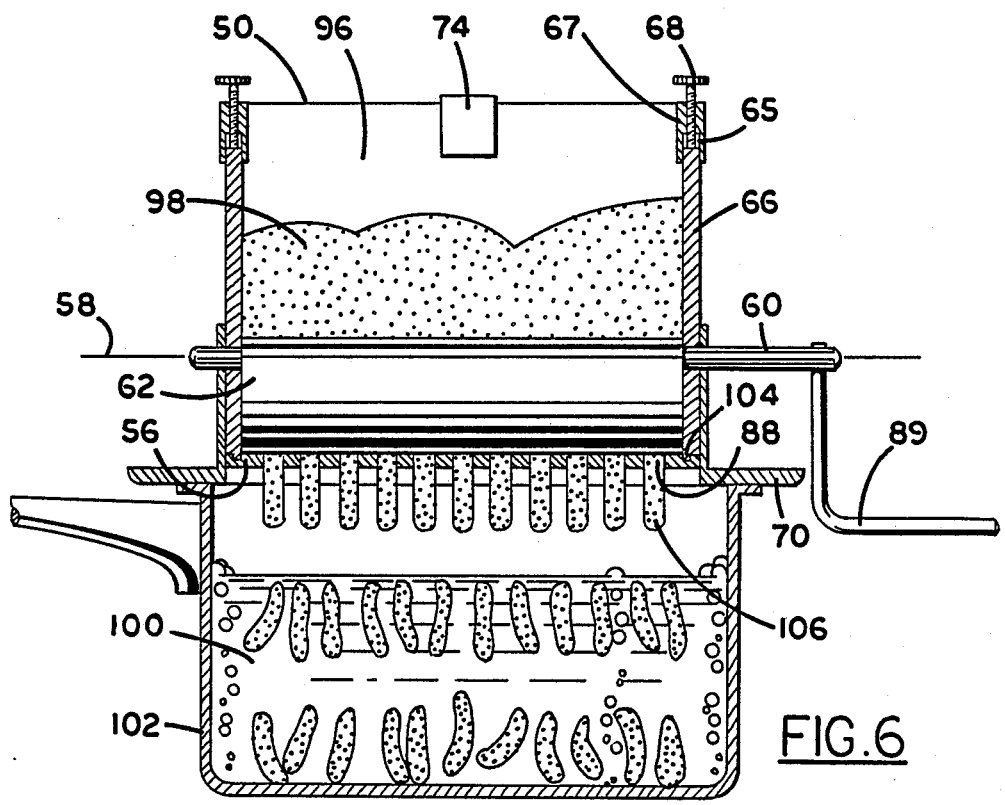
FIG. 6 is a front cross section view of the invention mounted on a container of water.

Referring to FIG. 6, chamber 96 formed by end plates 66 and U shaped wall 52 wherein the left upper side wall 54 is shown, contains a working supply of dough 98. As crank 89 is turned, feed cylinder 62 collects an amount of dough, bringing it around to lower curved wall 56 whereupon it is forced through dispensing holes 88, and cut off by feed cylinder 62 in a manner which causes a clean break in the dough, the portions of which fall into boiling water 100 of container 102.

Locating pins 104 help to keep the lower curved wall in place against the dragging force of the dough and feed cylinder as it rubs across the holes.

Figure 7:
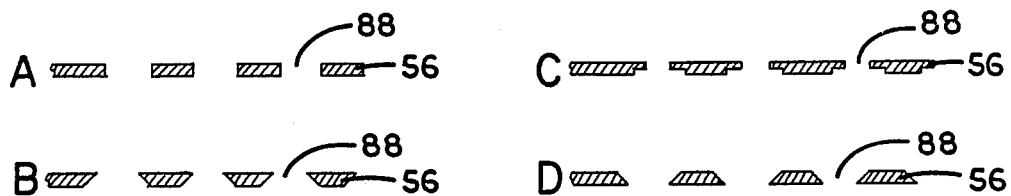
FIGS. 7A through 7D are cross-sectional representations of apertures of various embodiments of the invention.
Figure 8:
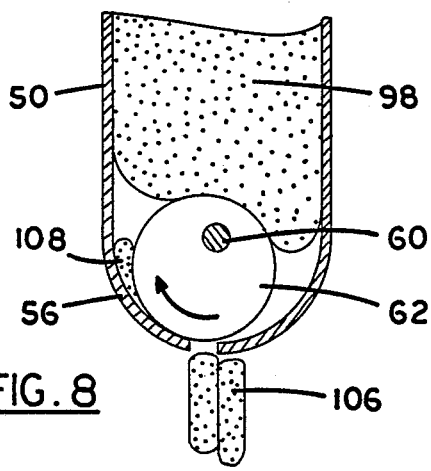
FIGS. 8 through 13 are schematic cross sectional views of the position of elements of the invention in various stages of its operation.

It is desired that cut off and separation of dough from the machine is effected cleanly and sharply. This is best accomplished when cross sectional thickness of the lower curved wall at the edge of the holes is at a minimum. FIG. 7 shows four cross sectional hole configurations. Configuration 7A is used when the lower curved wall is thin. Configurations 7B and 7C are used when the lower curved wall thickness is relatively great relative to the diameter of the hole. Configuration 7D, as do 7B and 7C, provide a thin wall cross section at the edges of the hole. 7B and 7C are preferred to 7D because the edges of the holes are closest to the surface of feed cylinder 62. 7D provides practical service when the dough has a high viscosity or thickness.

FIGS. 8 through 13 show one cycle of operating sequence in which feed cylinder 62 is rotating clockwise on shaft 60.

Dough 98 is shown with symbolic leading and trailing edges for purpose of explanation of the process operating steps. It is to be understood that the dough may fill the voids shown. However the dough-free spaces represent low compression areas so that the function is as if there were no doug in those areas.

Feed cylinder 62 has just passed over dispensing holes 88 and separated the dough at the holes, causing dough portions 106 to drop free of holes 88 in the lower curved wall 56. A remaining amount 108 of dough is pushed ahead of feed cylinder 62 toward the main supply of dough in the upper portion of the housing. The same portion of the rotating cylinder remains in association with the lower curved wall.

The cylinder need only be close enough to the lower curved wall, when it traverses the holes, to separate the discrete portions from the working supply. Actual contact with the wall, however, may be preferred if the dough is thin or has high cohesive properties.

Figure 9:
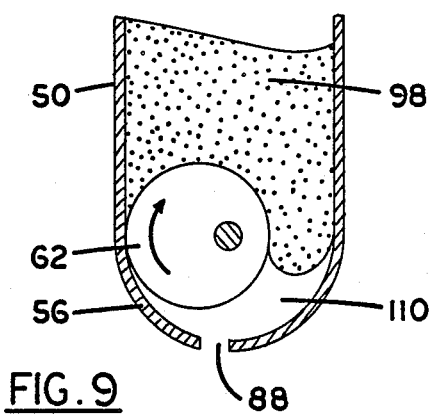

At 90 degree rotation shown in FIG. 9, feed cylinder 62 continues to move away from the holes, reducing pressure above them, and permitting additional dough to move into region 110 behind it.

Figure 10:
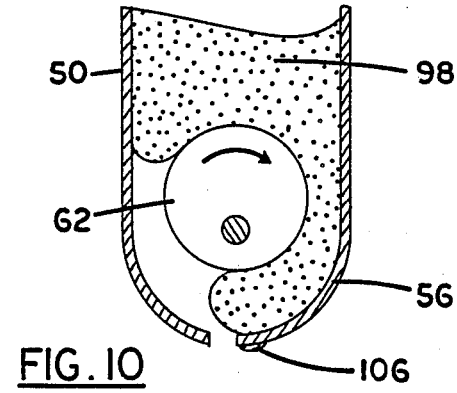

FIG. 10, pressure feed of dough to holes 88 and region 110 commences and the dough begins to move out through holes 88.

Figure 11:
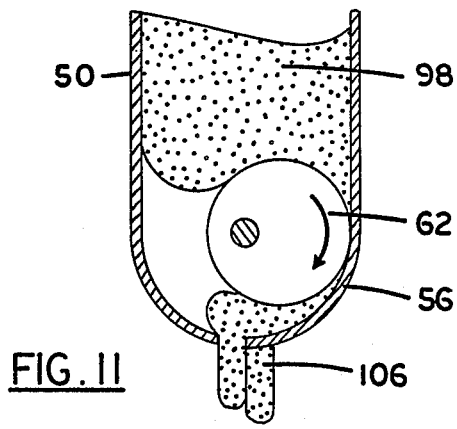

FIG. 11, at 270 degrees, an amount of the dough is pushed off from the bulk, encaptured, and pushed ahead for continued dispensing through holes 88.

Figure 12:
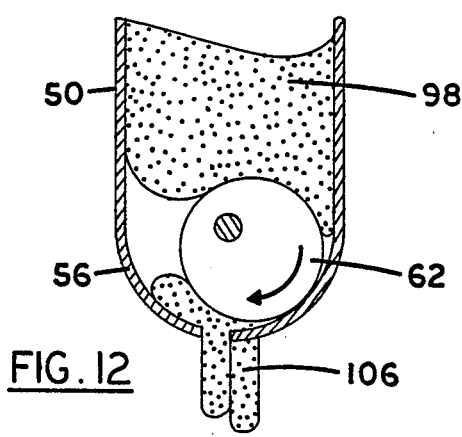

FIG. 12, the dough is nearly fully dispensed to make the desired portion and cylinder 62 is shown 45 degrees in advance of the location where it scrapes the dough from the dispensing holes.

Figure 13:
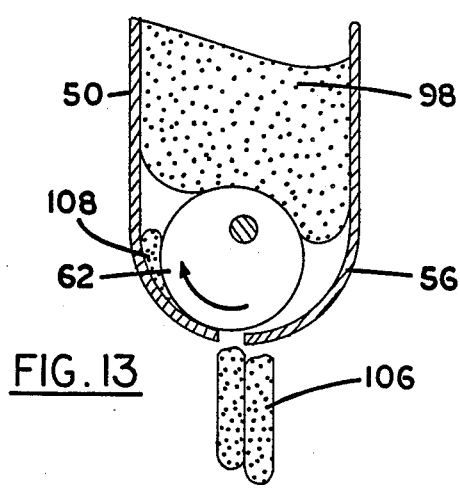

FIG. 13, the cylinder has scraped over the holes, the dough portions have separated from the lower curved wall, and the remainder of the encaptured amount 108 of dough is moved out of the intimate association area between the cylinder and the curved wall.

The shape of the cylinder is not limited to that illustrated in the figures, as long as its portion in intimate association with the first wall operates to entrap, squeegee or coax it along (depending upon its consistency) and separate the dough at the apertures as described.

It is within the contemplation of the invention for the cylinder to include a cut-off knife edge 112 as shown in FIG. 14. The knife edge comprises the cylinder's highest point of eccentricity. The cylinder also includes a flattened surface 114 that is located 180 degrees out of phase with the highest point of eccentricity. The flat space aids in promoting dough movement as the cylinder rotates.

Another embodiment of the invention is seen in FIGS. 15 and 16. Housing 116 is made in two parts separable at plane 118, and held together by clamps 120 and 122. Lip 124 holds sections 126 and 128 of housing 116 in alignment, one with respect to the other.

At their joining, sections 126 and 128 comprise split bearing 130 for supporting shaft 60. Feed cylinder 62 is mounted on shaft 60 and driven in cooperation with the shaft by drive pin 132. Bridge assembly 134 supports section 128 of housing 116 on container 102, over boiling water 100. Positioning legs, two shown fixed 136, and one slidable 138, bridge 134 over container 102 by engaging the inside surface of its walls. Positioning leg 138 is slidably mounted in slot 140 to adjust it to the container's inner diameter, and is fastened in place by locking screw 142.

Clamps 120 and 122 serve the dual purpose of assembling bridge 134 with sections 126 and 128 of housing 116. Clamp 122, semipermanently mounted to bridge 134 by threaded screw 144, provides slip-in recess 148 for receiving seal flanges 150 and 152 respectively of sections 126 and 128. Clamp 120 receives seal flanges 150 and 152 for effecting a temporary locked-seal between the two by means of thumb screw 154.

In operation, section 126 of housing 116 is held with the open side upward and is filled with dough 98. Section 128 is placed on top and the housing. It is temporarily sealed by slipping combined seal flanges 150 and 152 into slip-in recess 148 in clamp 122, and further, temporary lock-sealed with clamp 120 by means of thumb screw 154.

The housing is then placed on container 102, with section 126 uppermost, and crank 89 is turned to dispense dough portions 106 as described earlier.

Although the present invention has been described with respect to details of certain embodiments thereof, it is not intended that such details be limitations upon the scope of the invention. It will be obvious to those skilled in the art that various modifications and substitutions may be made without departing from the spirit and scope of the invention as set forth in the following claims.

Drawing numbers

PRIOR ART 20 bowl
22 shaft
24 handle
26 fixed handle
28 holes
30 perforated bottom
32 blade
34 cylinder
36 housing
38 dough
40 scraper edge
42 scraper edge slot
44 boiling water container

PRESENT INVENTION

50 Apparatus For Dispensing Dough
52 U shaped side wall
54 straight upper side wall (L or R)
56 lower curved wall
58 central axis
60 shaft
62 feed cylinder
64 outer edge
65 channel
66 end plate
67 threaded flange portion
68 tension screw
70 support bracket
72 take-up pin
74 handle bracket
76 reinforcing bracket
78 insulated handle
84 handle bracket screw
88 dispensing holes
89 crank
90 plastic bearing seal
92 spring
94 hold-pin
96 chamber
98 dough
100 boiling water
102 container
104 locating pin
106 dough portion
108 dough squib
110 region
112 cut-off knife edge
114 flattened surface
116 housing
118 plane
120 clamp
122 clamp
124 lip
126 dough holding section
128 section comprising curved wall 56
130 split bearing
132 drive pin
134 bridge
136 fixed positioning leg
138 slidable positioning leg
140 slot
142 locking screw
144 screw
148 slip-in-recess 150 seal flange (of 126)
152 seal flange (or 128)
154 thumb screw

What is claimed is:

1. An apparatus for dividing and delivering plastic material in discrete portions, said apparatus comprising:
   a housing for receiving a working amount of said plastic material,
   a shaft having a first axis, and means for mounting said shaft in said housing,
   a first wall on said housing, said first wall being curved on a first radius generated from said first axis,
   said first wall forming a plurality of apertures therethough, extending axially over a portion of said first wall,
   a generally cylindrical member said member being mounted for eccentric rotation on said shaft so that;
   said member is rotatable about said first axis, so that a portion of the curved surface of said member traverses said apertures and is in intimate association with a surface of said wall defining said apertures for pressing said amount for separating said portions from said working amount; and
   means for rotating said cylinder about said first axis for traversing said apertures,
   a surface of said member defining a knife edge extending axially along a surface of said member such that said knife edge is in said intimate association with the wall defining the apertures as said member traverses the apertures.

2. The apparatus as described in claim 1, further comprising:
   said cylinder's curved surface's intimate association with said apertures comprises rubbing contact with said first wall over said apertures.

3. The apparatus as described in claim 1 further comprising:
   said apertures being defined by sharp edges comprising abrupt breaks in the curved surface of said first wall so that a curved surface of the traversing said member separates portions of said plastic material from said working amount at said sharp edges.

4. The apparatus as described in claim 2, further comprising:
   said apertures being defined by sharp edges comprising abrupt breaks in the concave surface of said first wall so that a curved surface of the traversing said member separates portions of said plastic material from said working amount at said sharp edges.

* * * * *